US010956427B2

(12) United States Patent
Lachmi et al.

(10) Patent No.: US 10,956,427 B2
(45) Date of Patent: Mar. 23, 2021

(54) CONTINUOUS EVALUATION AND ADJUSTMENT OF SEARCH ENGINE RESULTS

(71) Applicant: Bioz, Inc., Los Altos, CA (US)

(72) Inventors: Karin Lachmi, Palo Alto, CA (US);
Daniel Levitt, Palo Alto, CA (US);
Ehud Pardo, Mountain View, CA (US);
Dan Grunspan, Herzeliya (IL)

(73) Assignee: BIOZ, INC., Palo Alto, CA (US)

( * ) Notice: Subject to any disclaimer, the term of this patent is extended or adjusted under 35 U.S.C. 154(b) by 83 days.

(21) Appl. No.: 15/605,771

(22) Filed: May 25, 2017

(65) Prior Publication Data

US 2018/0018334 A1 Jan. 18, 2018

Related U.S. Application Data

(63) Continuation of application No. 15/235,777, filed on Aug. 12, 2016, now abandoned.
(Continued)

(51) Int. Cl.
*G06F 16/00* (2019.01)
*G06F 16/2457* (2019.01)
(Continued)

(52) U.S. Cl.
CPC ...... *G06F 16/24578* (2019.01); *G06F 16/248* (2019.01); *G06F 16/252* (2019.01);
(Continued)

(58) Field of Classification Search
CPC ......... G06F 17/30684; G06F 17/30828; G06F 17/30864; G06F 17/30867;
(Continued)

(56) References Cited

U.S. PATENT DOCUMENTS 6,289,342 B1 * 9/2001 Lawrence ............. G06F 16/951
8,234,147 B2 * 7/2012 Olejniczak ........... G06Q 10/063
705/7.29
(Continued)

OTHER PUBLICATIONS

International Search Report and Written Opinion PCT/US2017/042433 dated Aug. 4, 2017, pp. 1-17.
(Continued)

*Primary Examiner* — Shew Fen Lin
(74) *Attorney, Agent, or Firm* — Perkins Coie LLP

(57) ABSTRACT

Taught is a search engine for science tools which dynamically evaluates search rank of said science tools through Natural Language Processing and machine learning. The search engine accepts into a corpus of public and private materials, which references individual science tools. Each item of the corpus is evaluated both as to how much that given item should be trusted, and what that item says about individual science tools. Each science tool is evaluated based on what the whole corpus of input data contains concerning those science tools, taking into account how valuable the source of the data is in order to render an overall score and search rank. The search engine generates a judgement of each individual science tool, which is dynamically updated as new information becomes available in the corpus of input data.

5 Claims, 9 Drawing Sheets

Related U.S. Application Data

(60) Provisional application No. 62/363,779, filed on Jul. 18, 2016.

(51) Int. Cl.

| | |
|---|---|
| *G06F 16/248* | (2019.01) |
| *G06F 16/25* | (2019.01) |
| *G06F 16/31* | (2019.01) |
| *G06F 16/951* | (2019.01) |
| *G06F 40/30* | (2020.01) |
| *G06F 40/247* | (2020.01) |
| *G06F 40/295* | (2020.01) |
| *G06N 20/00* | (2019.01) |
| *G06N 5/02* | (2006.01) |
| *G06F 40/40* | (2020.01) |

(52) U.S. Cl.
CPC .......... *G06F 16/313* (2019.01); *G06F 16/951* (2019.01); *G06F 40/247* (2020.01); *G06F 40/295* (2020.01); *G06F 40/30* (2020.01); *G06F 40/40* (2020.01); *G06N 5/02* (2013.01); *G06N 20/00* (2019.01)

(58) Field of Classification Search
CPC ............. G06F 17/30876; G06F 17/309; G06F 16/24578; G06F 16/248; G06F 16/252; G06F 16/313; G06F 16/951; G06F 17/278; G06F 17/2785; G06F 17/2795; G06F 17/28; G06Q 30/02; G06Q 30/0623; G06N 20/00; G06N 5/02
See application file for complete search history.

(56) References Cited

U.S. PATENT DOCUMENTS

| | | | |
|---|---|---|---|
| 8,321,425 B2 | 11/2012 | Custis et al. | |
| 8,468,153 B2 | 6/2013 | Truve et al. | |
| 8,515,828 B1* | 8/2013 | Wolf | G06Q 30/02 705/26.7 |
| 2008/0229828 A1* | 9/2008 | Buschman | G06F 16/24578 73/579 |
| 2009/0006216 A1* | 1/2009 | Blumenthal | G06Q 30/0601 705/26.62 |
| 2010/0217731 A1* | 8/2010 | Fu | G06F 16/35 706/20 |
| 2012/0054240 A1* | 3/2012 | Zhang | G06F 16/2468 707/780 |
| 2013/0080266 A1* | 3/2013 | Molyneux | G06Q 10/00 705/14.72 |
| 2013/0138478 A1* | 5/2013 | Hyde | G06F 16/212 705/7.33 |
| 2013/0204695 A1* | 8/2013 | Lee | G06F 16/9537 705/14.45 |
| 2014/0188861 A1* | 7/2014 | Angelo | G06F 16/9535 707/726 |
| 2014/0214825 A1* | 7/2014 | Zhang | G06F 16/9535 707/732 |
| 2015/0264093 A1* | 9/2015 | Madisch | G06Q 10/101 715/753 |
| 2016/0012507 A1* | 1/2016 | Narin | G06F 17/30876 705/26.61 |
| 2016/0103837 A1 | 4/2016 | Lee et al. | |
| 2016/0154856 A1* | 6/2016 | Olof-Ors | G06F 16/24578 707/728 |
| 2017/0109015 A1* | 4/2017 | Krasadakis | G06F 16/335 |
| 2017/0132626 A1* | 5/2017 | Kennedy | H04L 9/3236 |

OTHER PUBLICATIONS

Non-Final Office Action dated Jul. 18, 2017, for U.S. Appl. No. 15/235,777, filed Aug. 12, 2016.
Non-Final Office Action dated May 25, 2018 of U.S. Appl. No. 15/235,777 by Lachmi, K., et al., filed Aug. 12, 2016.
Final Office Action dated Dec. 21, 2017 of U.S. Appl. No. 15/235,777 by Lachmi, K., et al., filed Aug. 12, 2016.

* cited by examiner

CONTINUOUS EVALUATION AND ADJUSTMENT OF SEARCH ENGINE RESULTS

CROSS REFERENCE TO RELATED APPLICATIONS

This patent application is a continuation of U.S. patent application Ser. No. 15/235,777 filed Aug. 12, 2016, which claims the benefit of U.S. provisional patent application Ser. No. 62/363,779 filed Jul. 18, 2016, the entirety of each of these applications are incorporated herein by this reference thereto.

TECHNICAL FIELD

This disclosure is directed to the field of software, and more particularly, to dynamically evaluating an ever growing corpus of texts and analytical data relating to a domain of knowledge and evaluating the contents therein.

BACKGROUND

General-purpose search engines have become reasonably good at providing meaningful search results, particularly in domains of knowledge that are not highly technical and/or specialized. Some search engines employ "semantic" search techniques that provide contextual meaning and an understanding of searchers' intent, therefore improving search accuracy.

Search engines, semantic or otherwise, often use various Natural Language Processing (NLP) techniques; however, results are usually suboptimal when searching for specialized information.

Current scientific (ex: life-sciences) search tools are susceptible to this problem. The search tools focus on identifying research literature, providing cited references, and gaining broad insights into research trends and top performers. However, these tools do not enable scientists to search for and access information that will allow them to successfully perform their experiments.

The traditional approach of scientists today is to painstakingly search, download, print and read through hundreds of articles on a particular research problem, hoping to find a reference to a relevant specimen. The researcher then must undertake an equally difficult process of attempting to source the specimen, sometimes from uncooperative non-commercial laboratories or commercial suppliers, all of whom lack objective ratings of the quality availability, storage conditions, and other unique characteristics of often fragile specimens. This problem and others may be solved through improvements to search engine technology.

SUMMARY

Introduced are methods and systems that enable efficient and reliable ways to search for products used in biology-related experiments; analyze, aggregate, and structure scientific data in a corpus of published source data to provide a more informed decision on which product to choose; and provide unbiased and non-objective rating system about said products. Published source data includes research journals, research grants and grant proposals, scientific dissertations or patent documents.

Natural Language Processing (NLP), Named-Entity Recognition (NER) and machine learning are used to analyze each sentence in the documents and extract the text and other metrics about each product to build a knowledge base that can be queried.

Each item within the corpus is assigned a weight based on the extracted metrics. Purchase links and a non-exclusive, numeric value with a positive correlation to search rank are presented on a user display for users to make better informed decisions when continuing forward with their experiments.

BRIEF DESCRIPTION OF THE DRAWINGS

These and other objects, features and characteristics of the present embodiments will become more apparent to those skilled in the art from a study of the following detailed description in conjunction with the appended claims and drawings, all of which form a part of this specification. While the accompanying drawings include illustrations of various embodiments, the drawings are not intended to limit the claimed subject matter.

Figure 1:
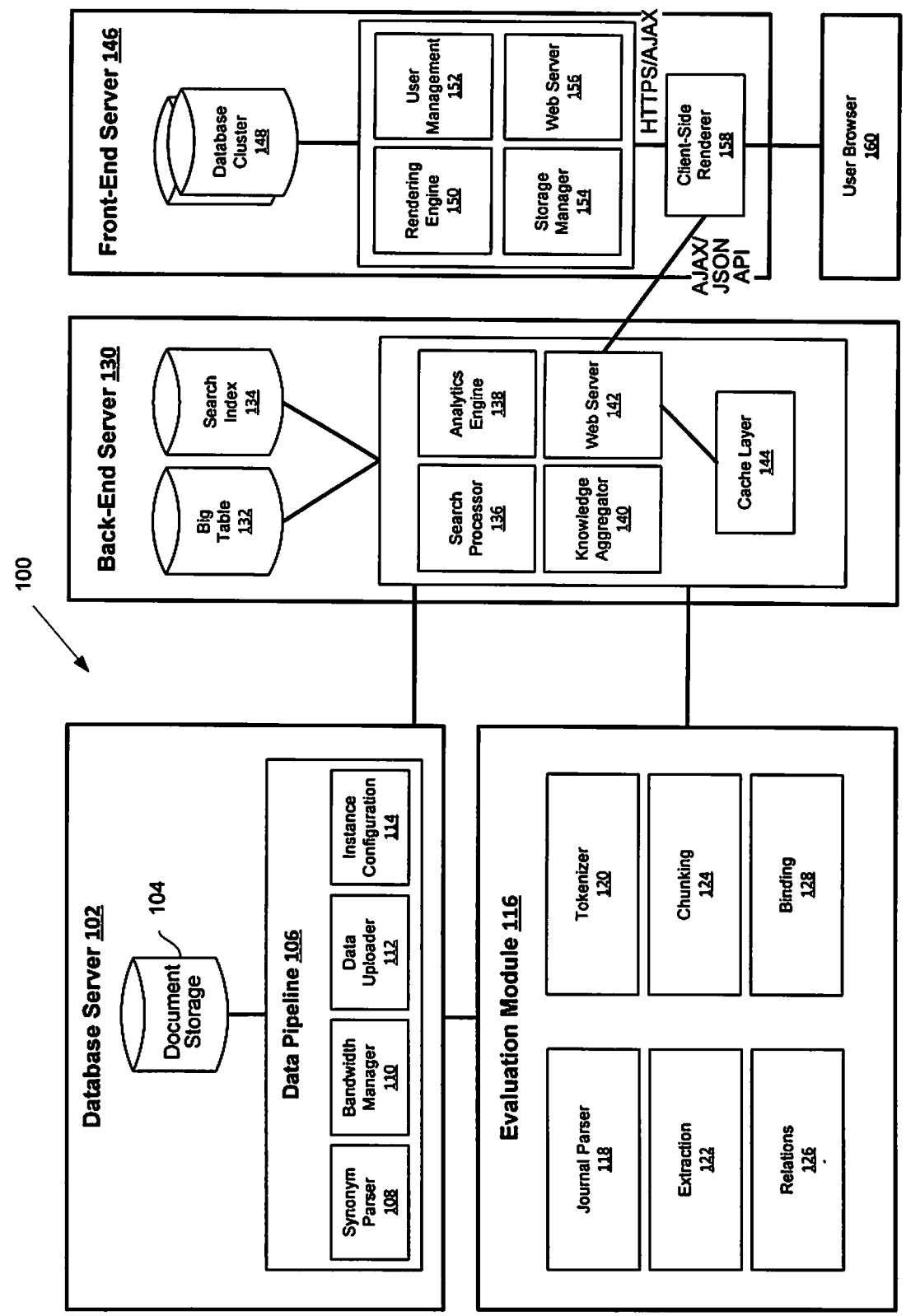
FIG. 1 is a block diagram illustrating an overview of a database server and an evaluation module communicating with servers that display information to a user browser.

The figures depict various embodiments described throughout the Detailed Description for purposes of illustration only. While specific embodiments have been shown by way of example in the drawings and are described in detail below, the invention is amenable to various modifications and alternative forms. The intention, however, is not to limit the invention to the particular embodiments described. Accordingly, the claimed subject matter is intended to cover all modifications, equivalents, and alternatives falling within the scope of the invention as defined by the appended claims.

DETAILED DESCRIPTION

Various embodiments are described herein that relate to systems and methods for extracting metrics from research journals to develop objective rating values for science tools.

In the following description, for the purposes of explanation, numerous specific details are set forth in order to provide a thorough understanding of the embodiments of the invention. One skilled in the art will recognize that the embodiments of the invention may be practiced without these specific details or with an equivalent arrangement. In other instances, well-known structures and devices are shown in block diagram form in order to avoid unnecessarily obscuring the embodiments of the invention.

Brief definitions of terms, abbreviations, and phrases used throughout this application are given below.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described that may be exhibited by some embodiments and not by others. Similarly, various requirements are described that may be requirements for some embodiments but not others.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling or connection between the elements can be physical, logical, or a combination thereof. For example, two devices may be coupled directly or via one or more intermediary channels or devices. As another example, devices may be coupled in such a way that information can be passed there between while not sharing any physical connection with one another. The words "associate with," meanwhile, mean connecting or relating objects, items, etc. For example, a piece of metadata may be associated with a particular legal entity. Additionally, the words "herein," "above," "below," and words of similar import, when used in this application, shall refer to this application as a whole and not to any particular portions of this application. Where the context permits, words in the Detailed Description using the singular or plural number may also include the plural or singular number respectively. The word "or," in reference to a list of two or more items, covers all of the following interpretations of the word: any of the items in the list, all of the items in the list, and any combination of the items in the list.

If the specification states a component or feature "may," "can," "could," or "might" be included or have a characteristic, that particular component or feature is not required to be included or have the characteristic.

The terms "module" and "engine" refer broadly to software, hardware, or firmware components (or any combination thereof). Modules and Engines are typically functional components that can generate useful data or another output using specified input(s). A module may or may not be self-contained. An application program (also called an "application") may include one or more modules, or a module may include one or more application programs.

A computer or a plurality of computers may be, for example, personal computers, mobile phones, PDAs, tablets (e.g., iPad®), or wearable devices (e.g., watches).

The terminology used in the Detailed Description is intended to be interpreted in its broadest reasonable manner, even though it is being used in conjunction with certain examples. The terms used in this specification generally have their ordinary meanings in the art, within the context of the disclosure, and in the specific context where each term is used. For convenience, certain terms may be highlighted, for example using capitalization, italics, and/or quotation marks. The use of highlighting has no influence on the scope and meaning of a term; the scope and meaning of a term is the same, in the same context, whether or not it is highlighted. It will be appreciated that the same element can be described in more than one way.

Consequently, alternative language and synonyms may be used for any one or more of the terms discussed herein, and special significance is not to be placed upon whether or not a term is elaborated on or discussed herein. Synonyms for certain terms are provided. A recital of one or more synonyms does not exclude the use of other synonyms. The use of examples anywhere in this specification, including examples of any terms discussed herein, is illustrative only and is not intended to further limit the scope and meaning of the disclosure or of any exemplified term. Likewise, the disclosure is not limited to various embodiments given in this specification.

A method is performed by one or more computers for extracting metrics from research journals to develop objective rating values for science tools.

FIG. 1 is a generalized block diagram illustrating an overview 100 of a database server 102 and an evaluation module 116 communicating with servers (back-end 130 and front-end 146) that display information to a user browser 160. A database server 102 contains documents in a document storage 104 that an evaluation module 116 will operate on by using NLP and machine learning.

A back-end server 130 behaves as an intermediary between a database server 102 and an evaluation module 116 to the front-end server 146. The front-end server 146 interfaces with a user browser 160. Someone with ordinary skill in the art will recognize that the configuration of the individual servers and modules is not limited to a single machine or several machines. Various implementations would adjust as most suitable for implementation circumstances or ordinary considerations in the art.

Then the data that is sent to the servers will display information relating to the search query on a user browser 160.

Figure 2:
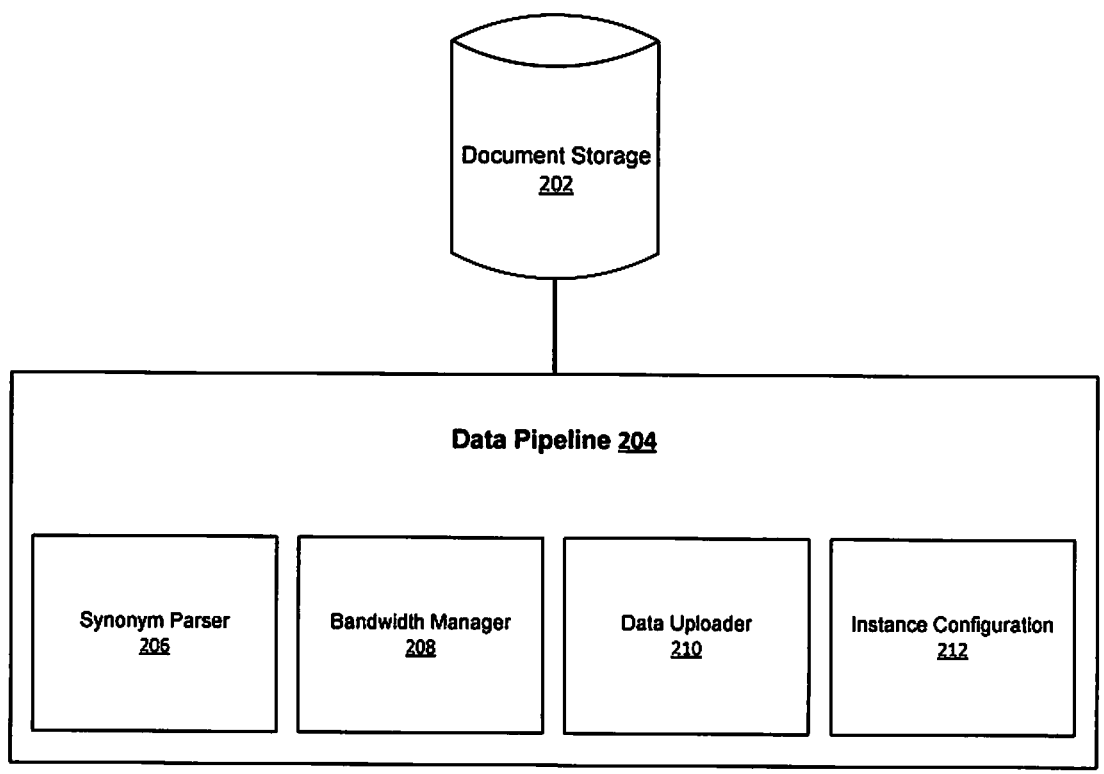
FIG. 2 is a block diagram illustrating a database server consisting of document storage that feeds into a data pipeline.

FIG. 2 is a block diagram illustrating a database server 200 consisting of document storage 202 that feeds into a data pipeline 204. An embodiment of this method receives a corpus of input data to document storage 202. This corpus of input data includes published research journals, patents, grants, published sales data, internally recorded analytical sales data, and published descriptions of scientific experiments. The corpus of input data is mined/parsed for science tools used and referenced within.

The science tools include laboratory equipment used for taking measurements (e.g., thermometers, graduated cylinders, scales, or spectrometers), equipment for conducting experiments (e.g., Bunsen burners, petri dishes, or microscopes), consumables (e.g., antibodies, assays, or reagents), and resources. These descriptions of scientific experiments and science tools are used in generating the results for said research journals.

Within a data pipeline 204, a synonym parser 206 is responsible for converting all of the different forms of synonym representations to a standard format compatible with the back-end server. Synonym representations may include MeSH (Medical Subject Headings), manually added synonyms, supplements, and company lists. One embodiment takes in one term and converts it into another field that represents all terms that are equivalent to it. This enables the search query to find data on a term, or all of its synonyms, in an efficient way without having to search for all of the synonyms of a term.

A bandwidth manager 208 optimizes the use of the available bandwidth. An embodiment of a bandwidth manager assesses the performance of the systems in terms of data input and output rates, content conversion rates, and computation times. Such embodiments will reallocate resources to improve overall performance of a system.

A data uploader 210 and an instance configuration 212 module exist in the data pipeline to communicate data from the database server 200 to other modules, such as the evaluation module or the back-end server. The instance configuration module instantiates an object or data, usually categorizing its value, e.g., type or class.

Then, the science tools are recorded into a database along with the research journals. Each scientific tool is passed into the database with the research document from which it originated.

Figure 3:
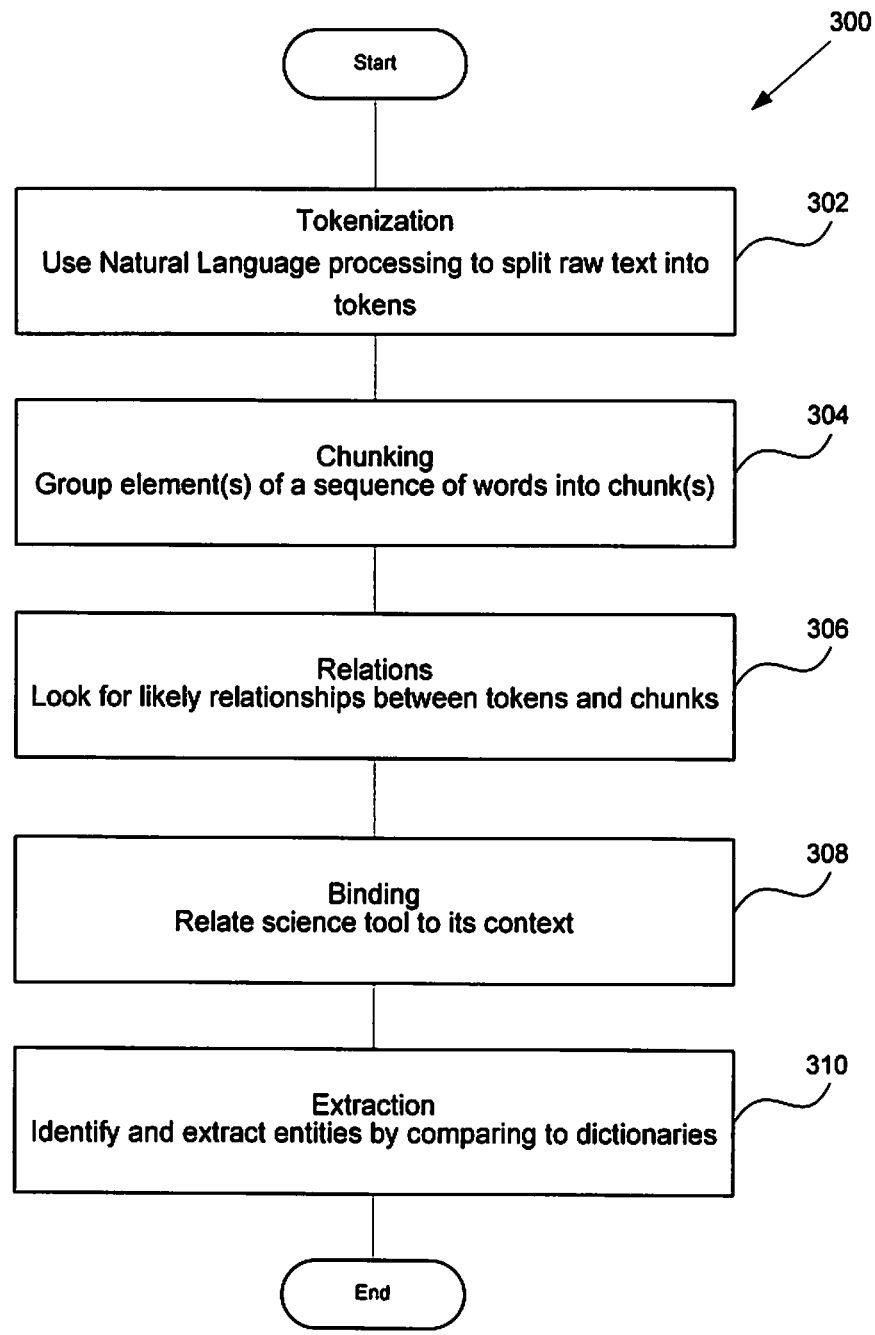
FIG. 3 is a flowchart diagram of an evaluation module consisting of semantic processing engines.

FIG. 3 is a block diagram of an evaluation module 300 consisting of the following semantic processing submodules: tokenization 302, chunking 304, relations 306, binding 308, and extraction 310. Note that a journal processing parser (118 of FIG. 1) can be contained in the evaluation module, which operates in the same fashion as the other submodules described herein; however, the modules evaluate different data.

First, a plurality of data is collected that pertains to science tools by parsing through a corpus of published source data in a journal parser module. The source data is comprised of items, including any of research journals, research grants and grant proposals, scientific dissertations, or patent documents. A natural language processor is used to populate a number of properties for the particular science tool. NLP is an area of research and application that combines computer science, artificial intelligence, and computational linguistics to understand and manipulate natural language text or speech.

A tokenizer module 302 then uses NLP to break a stream of text into words, phrases, symbols or other meaningful elements called tokens.

Next, a chunking module 304 groups elements of a sequence of words into one chunk, without any overlap between obtained groups. Verbs and nouns are identified and their exact offset is marked in the sentence. A domain specific custom chunker is used to tie multiple words into one phrase. Chunkers can identify parts of sentences (e.g. nouns, verbs, adjectives) to determine specific relationships between the words grouped into a chunk. Such examples of a chunking module are noun phrase chunking (NP-chunking) or verb group chunking.

A relations module 306 looks for likely relationships between different entities in the text.

A binding module 308 relates each science tool to its context. The module will consider several binding rules. One such rule can bind a product that a company produced to that company. Another rule can bind an assay to its assay name.

A semantic extraction module 310 identifies and extracts entities, facts, attributes, concepts and events. This module enables the analysis of unstructured content via NLP and Named-Entity Recognition (NER). The module contains a knowledge graph and is a superset of dictionaries. Dictionaries are used to identify various types of entities. The set of dictionaries are combinations of collected and edited dictionaries, catalogs from vendors, and public dictionaries in the biology research community such as the MeSH (PubMed) and Gene (NCBI) databases. A knowledge graph consists of additional sophisticated relationships that are needed to identify entities that are not in the set of dictionaries. The rules comprise company signs, company near location and identifiers of set of signs in text that identify the object as a company. Knowledge Graphs, such as the Knowledge Graph used and marketed by Google, Inc. collect information about objects in the real world and connects that information to related topics. By understanding the relationships between objects, the Knowledge Graph better understands what exactly the user is searching for. The techniques disclosed herein use both dictionaries and a knowledge graph to provide better search results.

After concluding the extraction steps in 310, the properties collected include any of source, conditions, catalog number, dilution, location, temperature, and assay.

Figure 4:
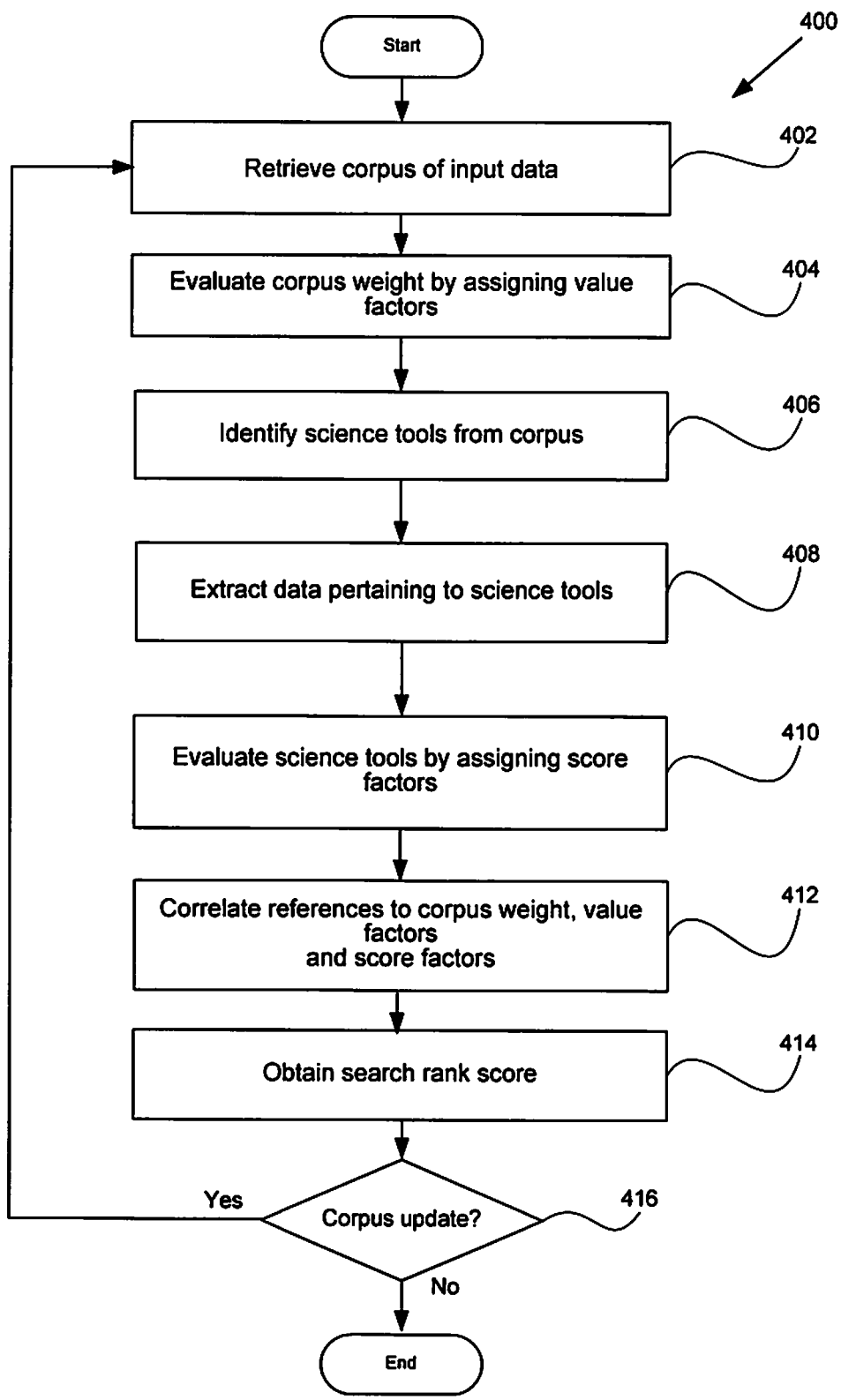
FIG. 4 illustrates the general process obtaining an objective rating.

FIG. 4 illustrates the general process obtaining an objective rating 400. In step 402, the database server takes in input, including the corpus of research journals. Further sources of input include analytical data obtained via the analytics engine concerning the purchase of particular science tools through the attached search engine managed between the front-end and back-end server. In step 404, items within the corpus are forwarded to the evaluation module wherein the journal parser generates a weight for each item through value factors.

The weight for each item in the corpus is later used to evaluate how much consideration should be provided to data extracted from any given item in the corpus. Weight values may be multi-faceted in the sense that a given item of the corpus may be given greater weight toward extracted data of a particular type over extracted data of other types. For example, a given publication (item in the corpus) may be peer rated highly for discussion of reagents but not for discussion of specific lab equipment or machinery. Accordingly, weighting provided to the particular class of science tools would vary depending on which science tool is concerned.

In step 406, a series of NLP engines within the evaluation module determine which science tools are identified in each item of the corpus. In step 408, data concerning each of the identified science tools is extracted. This extraction is connected to the number of times a science tool is referenced in each item of the corpus. Further, details concerning the science tool references (such as the manufacturer of the science tool referenced) are extracted as well. The extracted details thereby populate fields within a database for that science tool.

In step 410, through the use of the extracted science tools and the data pertaining thereto, the evaluation module assigns the science tools score factors. In step 412 the weight of each item in the corpus, based on the value factors, is applied to the score factors of each science tool to obtain an overall rating. In step 414, the overall rating is used to generate a search rank within science tools of a particular category. In step 416, the servers check for corpus updates. Corpus updates would include new publications, or new analytical data (such as sales figures), which cause the method to repeat in order to adjust to the newly included data.

In an example of this process, a database server takes in several million published research journals. Each of these corpus data sources, such as journals, have a number of characteristics that may be extracted, including a publish date, a publisher, a ranking for that publisher (ex: universities and the publications from university labs each have third party ratings compared to other universities), etc. Using those characteristics, the evaluation module assigns weights to each of these journals.

Once the journals are weighted, science tools in each of the journals are determined. For example, a given journal article provides details of an experiment involving a number of anti-GFP antibodies with a particular viral agent, handled in particular glassware, and observed through a particular microscope. Each of these tools, the various antibodies, the glassware, and the microscope, are identified as science tools. This process is conducted across the entire corpus to determine all of the tools referenced.

Once the tools are identified (examples in this case being a number of antibodies, a microscope and glassware), the evaluation module uses NLP to extract details about each of the science tools. These details include the number of times each science tool is referenced in individual articles and across the entire corpus, the manufacturer, the model number (where applicable), batch number (where applicable), the assay, the source of the science tool, the reported effectiveness of the science tool, and other details known in the art that are routinely reported in research journals.

The extracted details are used to inform score factors. The score factors are characteristics used to evaluate desirability of a given science tool. However these factors are not taken in isolation. The weight of each journal from which the data was extracted influences the end result as well. In this way, not only the raw data but the source of the raw data is considered in determining an overall rating. The overall rating may be portrayed in a non-exclusive, numeric value with a positive correlation to search rank. Examples include a 1-10, or 1-5 scale represented numerically or graphically (such as with stars). The higher the number the greater the influence on the search rank for that given science tool.

In this way, when a user later queries the search engine for anti-GFP antibodies, anti-GFP from a given source is compared to anti-GFP of another source or substitute antibodies by overall rating. This comparison informs the search rank and the end search result display.

As new research journals are published and search engine analytics are applied to the corpus, the search rank of science tools changes.

Figure 5:
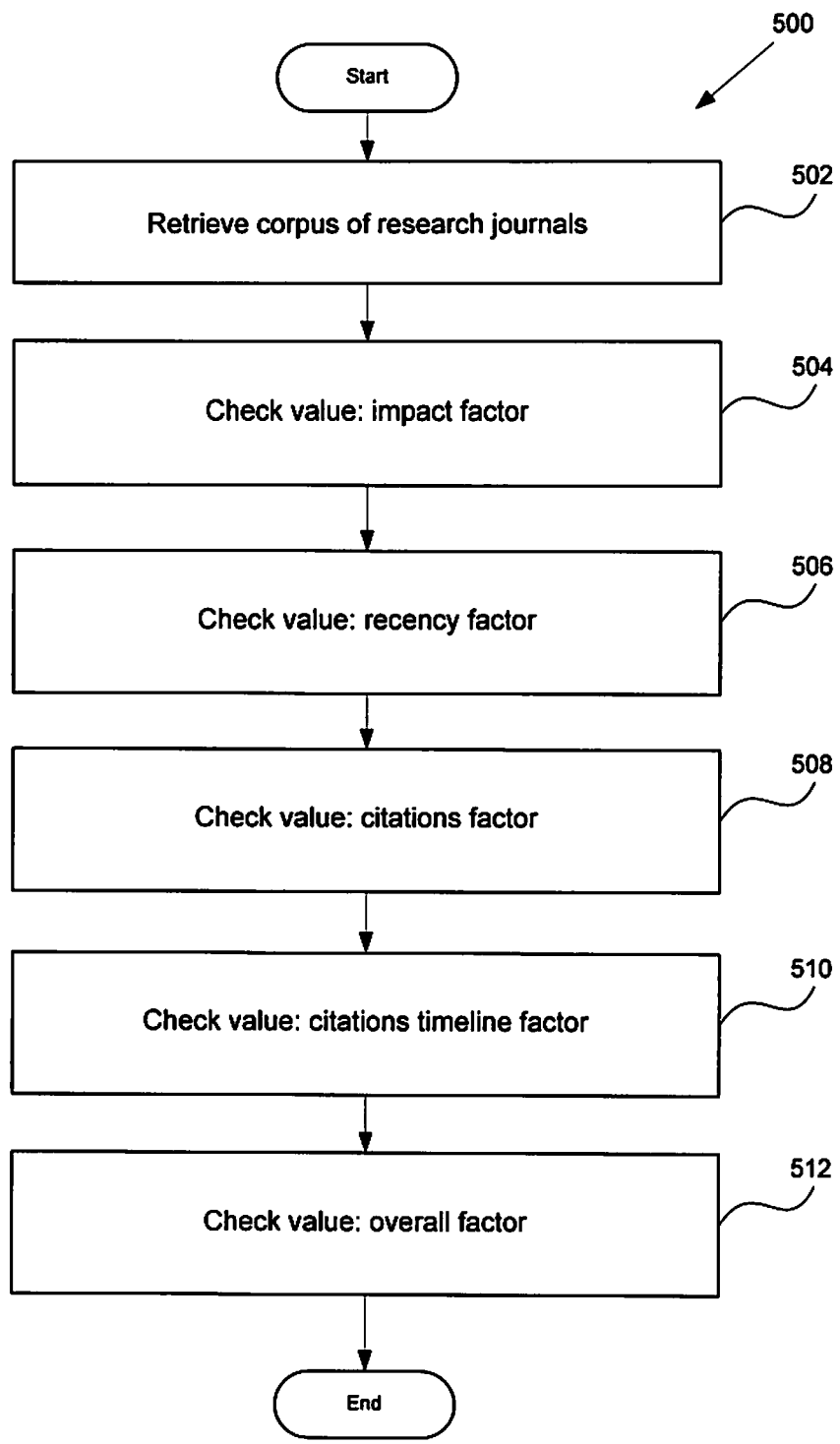
FIG. 5 is a flowchart showing how to obtain the overall corpus weight.

FIG. 5 is a flowchart 500 showing how to obtain weights of individual items within the corpus. In step 502, using an evaluation module, specifically from the information obtained in the Journal Processing parser block, the corpus of journal articles is retrieved. Value factors are assigned to each research journal. The value factors are not necessarily evaluated and assigned in any particular order. In some embodiments, the order of evaluation varies or is even performed simultaneously. The choice of order of the many steps in FIG. 5 is arbitrary.

In step 504, each item in the corpus is assigned an impact factor. The impact factor measures the average impact of original research articles and review articles appearing in the same journal. The impact factor is determined by third-party rankings for the publication each research journal belongs to. An example of such third-party ranking is the yearly Thomson Reuters impact factor.

In step 506, each item in the corpus is assigned a recency factor. The recency factor is determined by how recent the item in the corpus was published from which this result came from. A more recently published journal yields a higher rating. In step 508, each item in the corpus is assigned a citations factor. The citations factor concerns how many mentions a given item of the corpus has (such as how often a given item is referenced by other items), measured against the entire corpus of items analyzed. In step 510, each item in the corpus is assigned a citations timeline factor. The citations timeline factor refers to how recently the citations to the item have occurred, where a recent group of citations is given greater value over older groups of citations.

In step 512, each item in the corpus is assigned an overall factor 512. The overall factor is a combination of all of the other value factors. The overall factor provides a primary weight to a given item in the corpus. The overall factor is not necessarily the sole weight of a given item in the corpus. Based on particular science tools, or particular search queries, more importance may be applied to a particular value factor. In such cases, the weight assigned to an item of the corpus varies.

Figure 6:
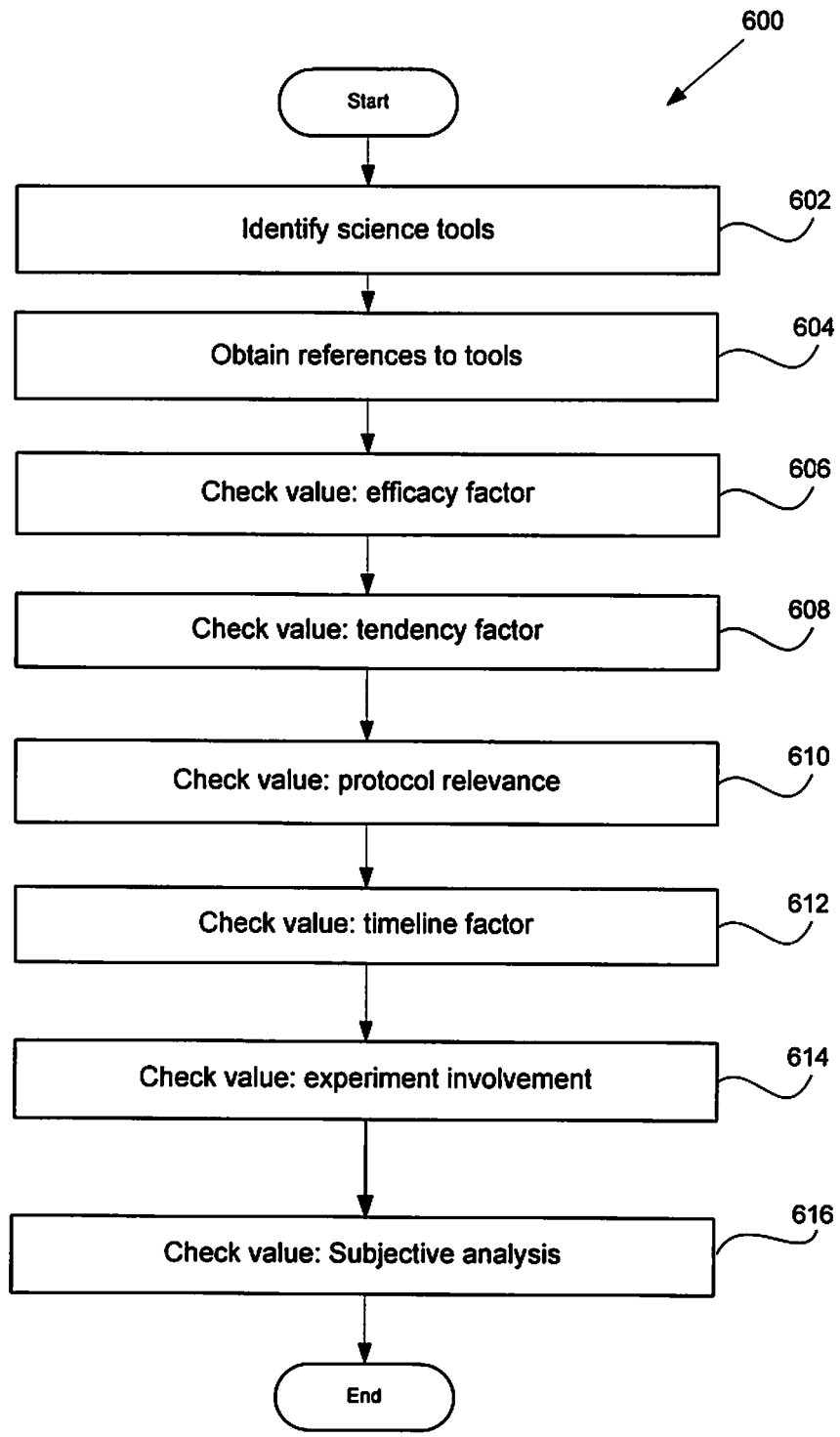
FIG. 6 is a flowchart illustrating how to obtain score factors.

FIG. 6 is a flowchart illustrating how to obtain score factors for science tools identified in the items of the corpus. In step 602, the science tools are identified from the corpus of research journals. The science tools are identified with natural language processors and server-stored dictionaries that contain an assortment of science tools and synonyms thereto. In step 604, the evaluation module uses NLP to identify references to said science tools. The references are further informed by contextual details and properties of the item within the corpus wherein the references originated. These properties may be programmed through object oriented composition.

The Evaluation Module uses the frequency of references, the contextual details and properties to generate score factors that are assigned to scientific tools. The score factors are similar to the value factors except that each pertains to a specific science tool as opposed to an item in the corpus (such as a published research journal). Similarly to the value factors, the exact order the score factors are assigned is arbitrarily portrayed. The order may be rearranged or performed simultaneously.

In step 606, each science tool identified is assigned an efficacy factor. The efficacy factor is determined by a number of times a given science tool with a particular source is cited as compared to the given science tool as cited having other sources. Examples of source include the manufacturer or the purchase location. Where a science tool may be anti-GFP antibody, the chosen antibody varies in quality based on the manufacturer and distributor; therefore, it is important to differentiate between these details via contextual language around where the science tools are identified.

In step 608, each science tool identified is assigned a tendency factor. The tendency factor is determined by the number of times the given science tool is referenced across the corpus of research journals as compared to a number of references similar science tools have. This is similar to the efficacy factor, except taken in the average across all available science tools.

In step 610, each science tool identified is assigned a protocol relevance. Protocol relevance is determined by the frequency of the given science tool with the same composition or inheritance of objects as referenced in the group of research journals as being used in an experiment with data.

In step 612, each science tool identified is assigned a timeline. Timeline is determined by an aggregation of time data for trends for the given science tool. In other words, timeline depicts how many times the product was linked to a specific category (e.g., companies or assays) and how the product changed over time. In step 614, each science tool identified is assigned experiment involvement. Experiment involvement is determined by a ratio of efficacy factor to protocol relevance.

In step 616, each science tool identified is assigned a subjective analysis score. This is obtained through NLP of the science tool references to identify author evaluations of a given science tool. Sentiment analysis is applied to the science tool reference, which is identified as containing author evaluations. Through the sentiment analysis across the corpus, the science tool is assigned a positive or negative score based on the subjective evaluations of the authors of individual items of the corpus.

Once these score factors have been defined for each science tool, the value factors are applied as a weighting to influence an overall score formula.

Figure 7:
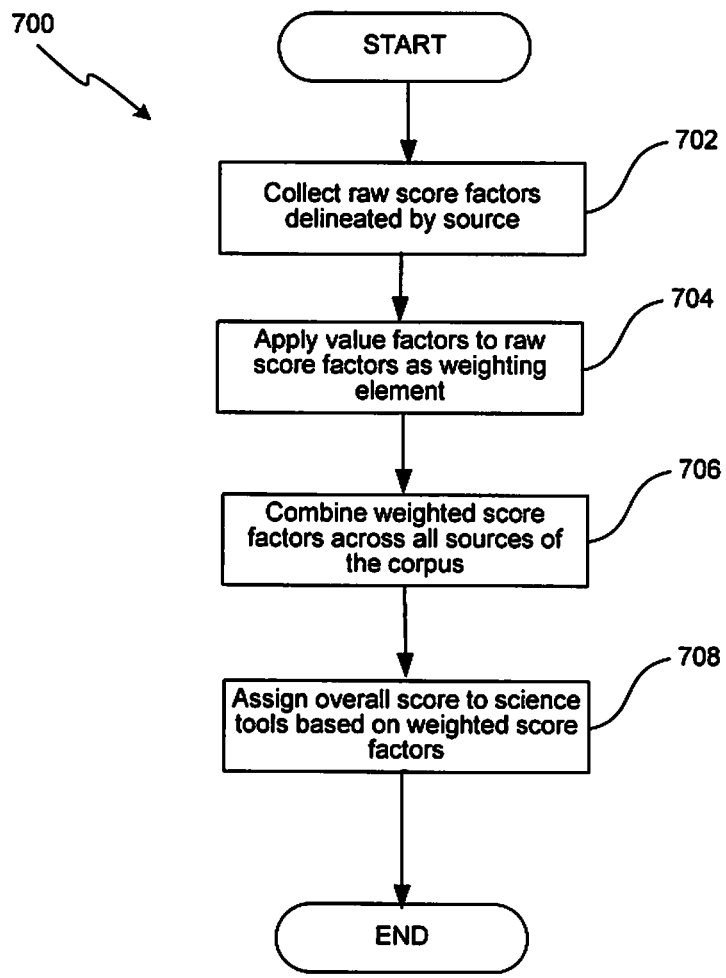
FIG. 7 is a flowchart illustrating how value factors are applied as weighting to score factors to obtain a search ranking.

FIG. 7 is a flowchart illustrating how value factors are applied as weighting to score factors to obtain a search ranking. In step 702, raw score values determined as taught in FIG. 6 are obtained. In step 704, value factors as pertaining to specific items of input data in the corpus (such as research journals, patents, grants, sales data, internal search and purchase analytics, etc.) are applied as weighting to the science tool score factors derived therefrom.

In this way, a machine is programmed with judgment. Data from a source is considered with a weight fitting of the source as determined by the value factors of that source. Sources with better value factors influence a final score factor of the associated science tools discussed.

In step 706, the weighted score factors from each of the items in the corpus are combined such that each given science tool has only a single set of score factors. The single set of score factors assigned to science tools have thus taken into account the objective influential value of each of the items in the corpus that reference that given science tool. In step 708, the single set of weighted score factors are evaluated in order to provide a single overall score. The single overall score affects search rank within a search engine and may be displayed as a non-exclusive, numerical score, such as 1-5 stars.

Figure 8:
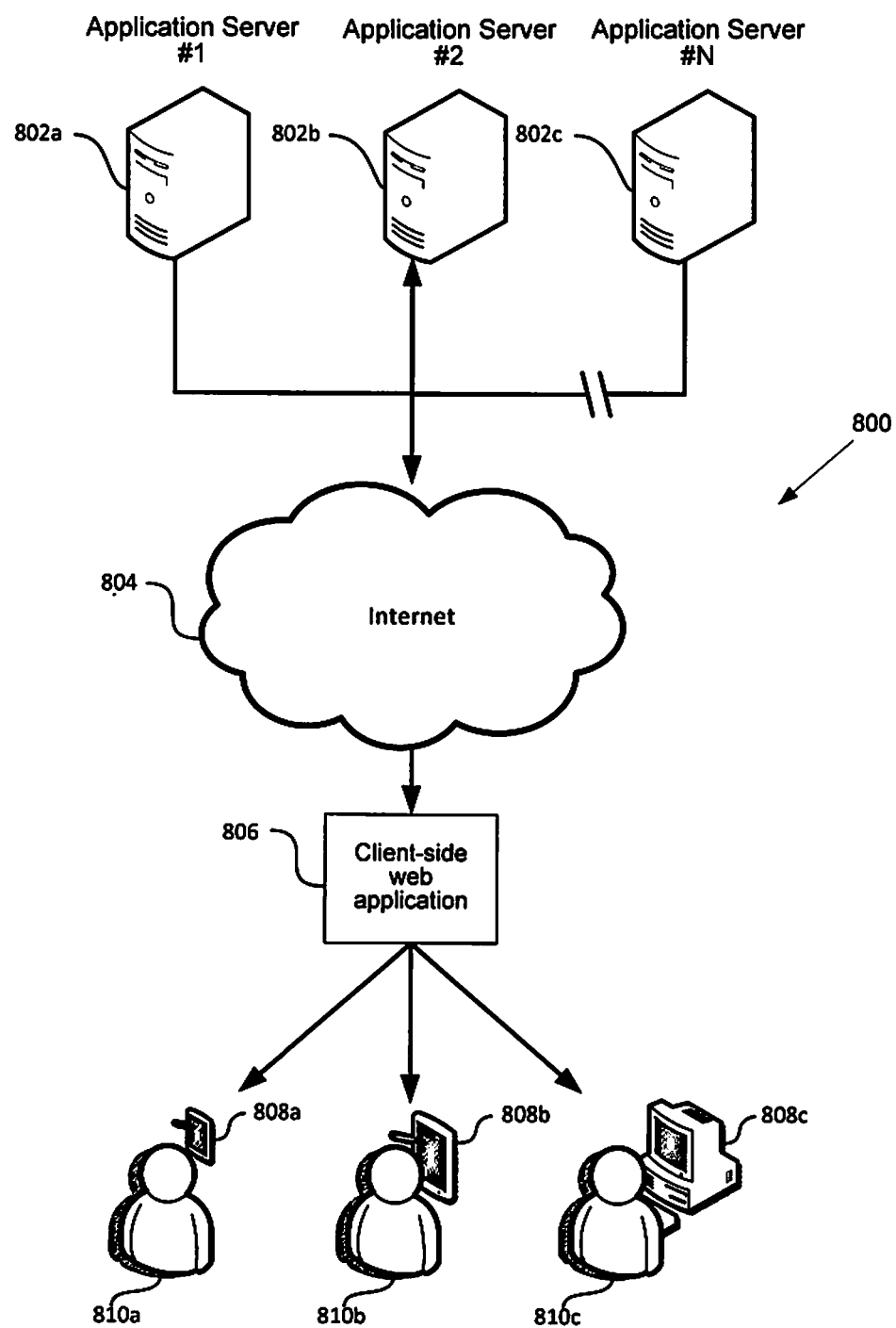
FIG. 8 is a block diagram illustrating user connection to a science tool search engine.

FIG. 8 is a block diagram illustrating a system 800 of user connection to a science tool search engine. To search for a science tool, a client-side web application 806 receives a search request. The client-side web application 806 forwards the search request through the Internet 804 to application servers 802. The servers 802 access a searchable database to process the search request for the particular science tool and will return to the user 810 said search results to a user display 808 organized by search rank. The rating value for each of the search results is a non-exclusive, numeric value with a positive correlation to its search rank. Some embodiments of the rating value can be a five-star rating or a rating from 1 through 10 where a low value equates to a low rating with low confidence and a higher value equates to a high rating with high confidence.

Displayed through the client-side web application 806 on a user web interface (on a user device 808), associated purchase links for each of the search results are displayed. Each search result is listed for a particular science tool, where each result displayed is differentiated by source (e.g. manufacturers or vendors). If no source is available for that science tool, a substitute is offered instead. The displayed purchase links redirect users to a web page for the particular science tool from a particular source. Examples of a web page can be a link to an external manufacturer's webpage, an external purchasing webpage, an internal webpage, or a voice command device like the Amazon Echo. Additionally, the search rank for the particular science tool is based on the frequency users click on a given associated purchase link.

From this data pertaining to science tools, a searchable database is populated with particular science tools based on direct references to the particular science tools within the items of the corpus of published source data. With the value scores acquired, the overall score weight can be obtained.

A search rank score is generated for the given science tool with respect to the other science tools by combining the score factors and the value factors. Data used to assign the score factors is weighted by the value factors of the group of research journals. Assigning a weight to each item is further determined by a hierarchy of item types within the corpus of source data. Each item within the corpus of published source data is assigned a weight based at least on time-related factors, independently assigned peer rankings, and citation frequency factors.

Next, a search rank is generated for each of the particular science tools amongst similar science tools having different sources. This search rank is based on the content of the direct references to the particular science tools within the items of the corpus of published source data. The content of the direct references to the particular science tools includes any of the score factors: efficacy factor, tendency factor, protocol relevance, timeline and experiment involvement.

The content of the direct references contain two subjective qualities, a subjective factor and subjective accounting. A subjective factor is where an author can acknowledge an influence relating to a scientific tool. The influence content is assigned a weight to the content it originates from within the corpus of published source data. This influence content from the direct science references contributes to generating the search rank.

Subjective accounting is applied to the content of the direct references to the particular science tools. It originates from an author of a given item of the corpus of published source and includes opinion text. This is different from the weight assigned in the subjective factor as this accounting evaluates the actual text with a natural language processor to determine the tone, value, and impact.

Figure 9:
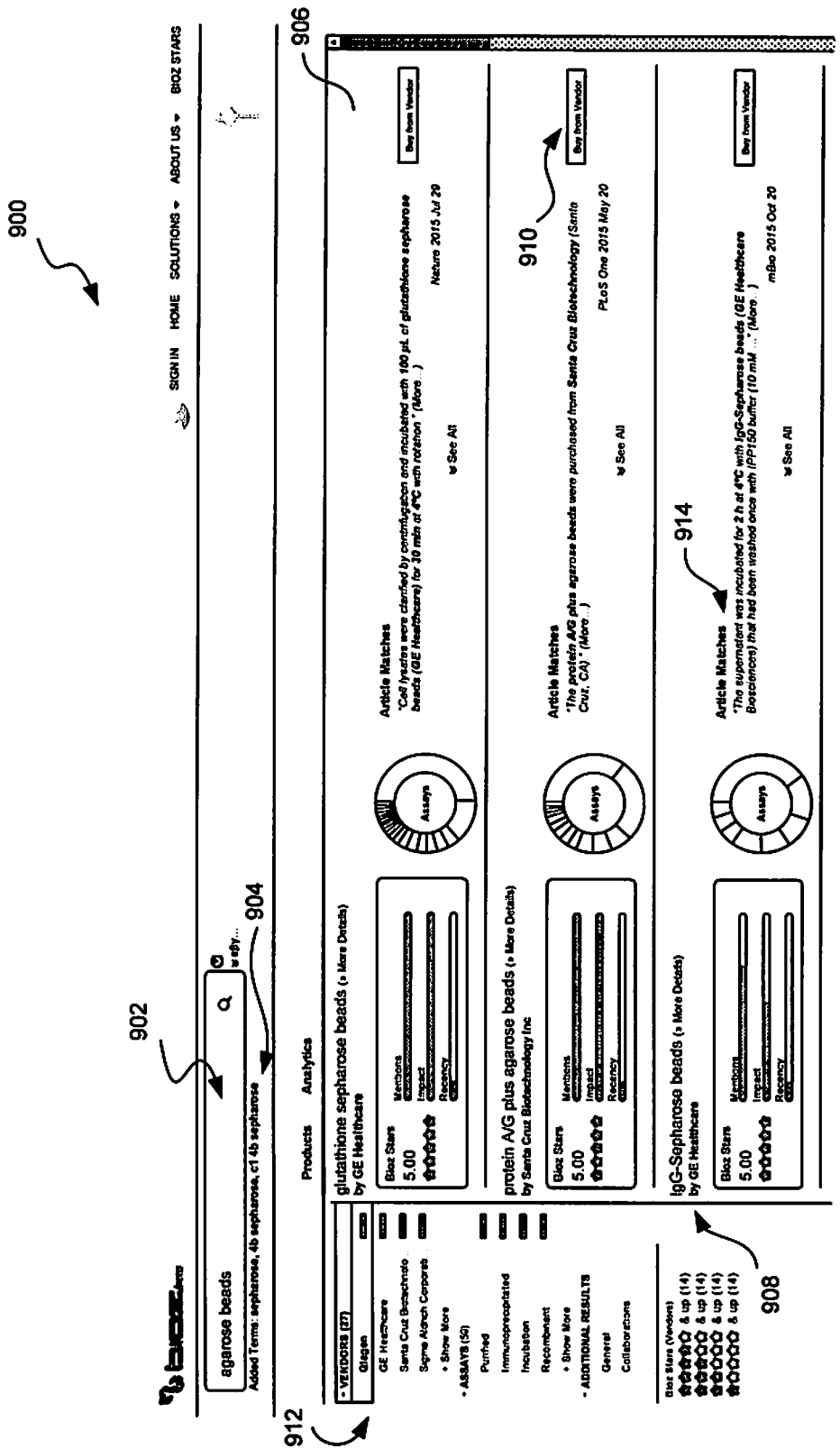
FIG. 9 is a rendering of a user interface for a science tool search engine.

FIG. 9 is a rendering of a user interface for a science tool search engine 900. The example in the figure displays a search for agarose beads in the search field 902. The search automatically applied dictionary synonyms 904 to the search such as the trade name, Sepharose. Results 906 are shown below the search field 902, the first three each have a maximum overall score. Order of similarly scored results may be arbitrary or organized based on a particular score factor result for that science tool.

Further, the results 906 displayed each have a source/manufacturer listed 908 and a purchase link 910. In some embodiments, the purchase link 910 may redirect users to a new purchase web page controlled by the source/manufacturer. In some embodiments, a new page or pop up containing purchase fields are presented to the user upon clicking the purchase link 910. The search engine keeps analytical data concerning the use of the purchase link 910 button and this analytical data is fed back into the corpus of input data to influence the search results. Further, purchase returns are similarly recorded and influence search ranks.

On the left side of the user interface 900, users are able to filter the results further to narrow or broaden the returned science tools. Displayed in the figure are filters 912 for assay, for overall score, and for source/manufacturer. Selected filters are applied to the search results.

Within each search result is a snippet 914 of an item from the corpus which the particular search result science tool is referenced. Clicking the snippet enables users to scroll down and read further contextual information upon which the overall score and search rank are based.

REMARKS

The foregoing description of various embodiments of the claimed subject matter has been provided for the purposes of illustration and description. It is not intended to be exhaustive or to limit the claimed subject matter to the precise forms disclosed. Many modifications and variations will be apparent to one skilled in the art. Embodiments were chosen and described in order to best describe the principles of the invention and its practical applications, thereby enabling others skilled in the relevant art to understand the claimed subject matter, the various embodiments, and the various modifications that are suited to the particular uses contemplated.

While embodiments have been described in the context of fully functioning computers and computer systems, those skilled in the art will appreciate that the various embodiments are capable of being distributed as a program product in a variety of forms and that the disclosure applies equally regardless of the particular type of machine or computer-readable media used to actually affect the distribution.

Although the above Detailed Description describes certain embodiments and the best mode contemplated, no matter how detailed the above appears in text, the embodiments can be practiced in many ways. Details of the systems and methods may vary considerably in their implementation details while still being encompassed by the specification. As noted above, particular terminology used when describing certain features or aspects of various embodiments should not be taken to imply that the terminology is being redefined herein to be restricted to any specific characteristics, features, or aspects of the invention with which that terminology is associated. In general, the terms used in the following claims should not be construed to limit the invention to the specific embodiments disclosed in the specification, unless those terms are explicitly defined herein. Accordingly, the actual scope of the invention encompasses not only the disclosed embodiments, but also all equivalent ways of practicing or implementing the embodiments under the claims.

The language used in the specification has been principally selected for readability and instructional purposes, and it may not have been selected to delineate or circumscribe the inventive subject matter. It is therefore intended that the scope of the invention be limited not by this Detailed Description, but rather by any claims that issue on an application based hereon. Accordingly, the disclosure of various embodiments is intended to be illustrative, but not limiting, of the scope of the embodiments, which are set forth in the following claims.

The invention claimed is:

1. A method performed by one or more computers for extracting metrics from research journals to develop objective rankings for science tools in a web search engine, the method comprising:
   a.) receiving in a database, a corpus of research journals, the research journals including descriptions of scientific experiments and the science tools used therein, wherein science tools include equipment, consumables, and resources used in generating the research for said research journals;
   b.) recording, into the database, science tools included in the corpus of research journals, each scientific tool including a source;
   c.) assigning, by a processor implemented evaluation module, value factors to each research journal, the value factors including:
      i.) an impact factor as determined by third party rankings for a publication each research journal belongs to;
      ii.) a recency factor as determined by how recently each research journal was published;
      iii.) a citations factor as determined by the number of times other research journals cite a given research journal;
      iv.) a citations timeline factor as determined by how recently a majority of citations for the given research journal have occurred; and
      v.) an overall factor as determined by combining the impact factor, recency factor, citations factor, and citations timeline factor;
   d.) assigning, by the processor implemented evaluation module, score factors to the science tools, the score factors including, for each science tool:
      i.) efficacy factor as determined by a number of times a given science tool with a particular source is cited as compared to the given science tool is cited having other sources;
      ii.) tendency factor as determined by a number of times the given science tool is referenced across the corpus of research journals as compared to a number of references similar science tools have;
      iii.) protocol relevance as determined by a frequency the given science tool is referenced in the corpus of research journals as being used in an experiment with data;
      iv.) timeline as determined by an aggregation of time data for trends for the given science tool; and
      v.) experiment involvement as determined by a ratio of efficacy factor to protocol relevance;
   e.) receiving a search query, at the web search engine;
   f.) generating a rank score for each science tool with respect to other science tools using a combination of the score factors, wherein data used to assign the score factors is weighted by the value factors of the corpus of research journals;
   g.) returning search results, by the web search engine, including a plurality of science tools, each of the plurality of science tools matching the search query; and
   h.) displaying the given science tool within the search results ordered based on the rank score of each of the plurality of science tools as compared to other rank scores of other science tools included in the search results.

2. The method of claim 1, further comprising:
displaying a purchase link for a first science tool of the plurality of science tools, the purchase link redirecting users to a web page of a source for the first science tool.

3. The method of claim 2, wherein generating the rank score further comprises:
updating rank score for the first science tool based on a frequency that users click on the purchase link.

4. The method of claim 1, further comprising:
extracting from the corpus of research journals a number of properties for a first science tool of the plurality of science tools, the properties include any of:
source;
use conditions;
catalog number;
dilution; location;
temperature; or
assay.

5. The method of claim 1, further comprising:
displaying a representation of how a given science tool in the search results measures on a number of criteria used to determine search rank, the number of criteria including at least one of:
a time related factor;

an independently assigned peer ranking; or
a citation frequency factor.

\* \* \* \* \*